United States Patent [19]

Robbins

[11] 4,201,953
[45] May 6, 1980

[54] LASER SYSTEM WITH TRIANGULATED CAPACITOR ENCIRCLING THE LASER HEAD

[76] Inventor: Gene A. Robbins, P.O. Box 7639, Roswell, N. Mex. 88201

[21] Appl. No.: 901,429

[22] Filed: May 1, 1978

[51] Int. Cl.² ............................................. H01S 3/09
[52] U.S. Cl. ........................ 331/94.5 PE; 331/94.5 D
[58] Field of Search ..................... 331/94.5 D, 94.5 P, 331/94.5 PE

[56] References Cited

U.S. PATENT DOCUMENTS 3,828,277  8/1974  Otto et al. .................... 331/94.5 PE

OTHER PUBLICATIONS

Schwab et al., Compact High-Power N₂ Laser: Circuit Theory and Design, IEEE J. Quant. Electr., vol. QE-12, No. 3 (Mar. 1976), pp. 183–188.

*Primary Examiner*—William L. Sikes

[57] ABSTRACT

A laser head is constructed with a three-plate capacitor wrapped around the head. The capacitor plates are triangulated to assist in beam formation. The power supply is a resonant charge circuit, with a switch arrangement for regulating the extent of charge accumulated before the laser is fired, and the firing is regulated by another switch. The entire system is compact and constructed to utilize laser heads of different diameters, without changing the power supply or other components of the system.

5 Claims, 12 Drawing Figures

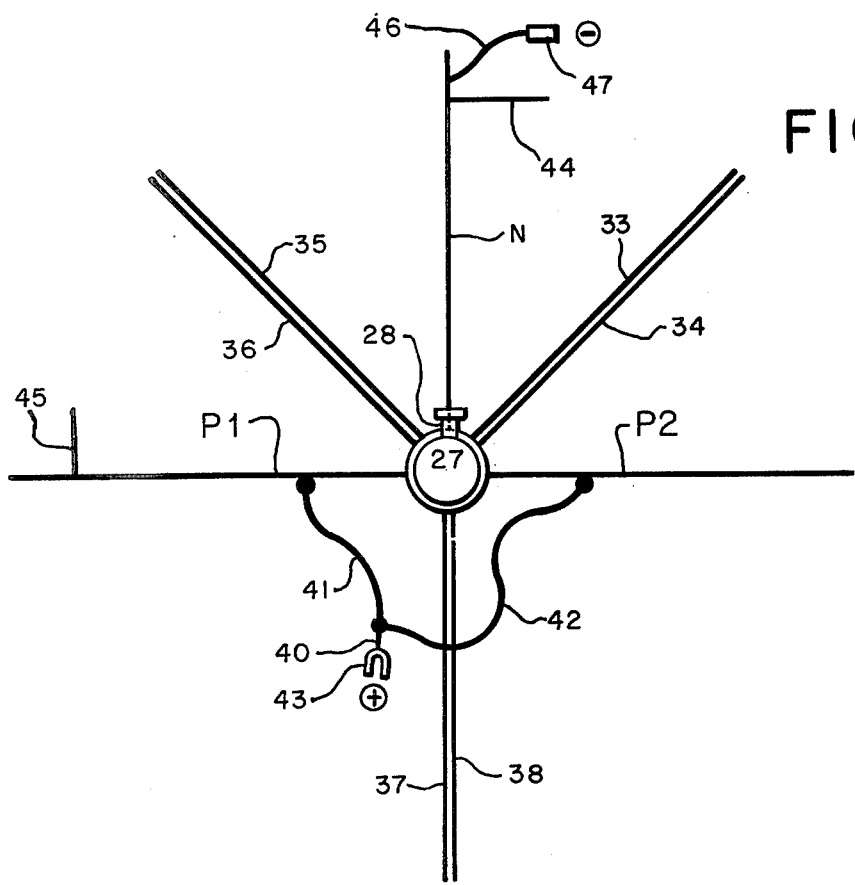
FIG. 7
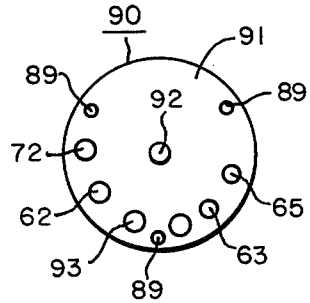
FIG. 11
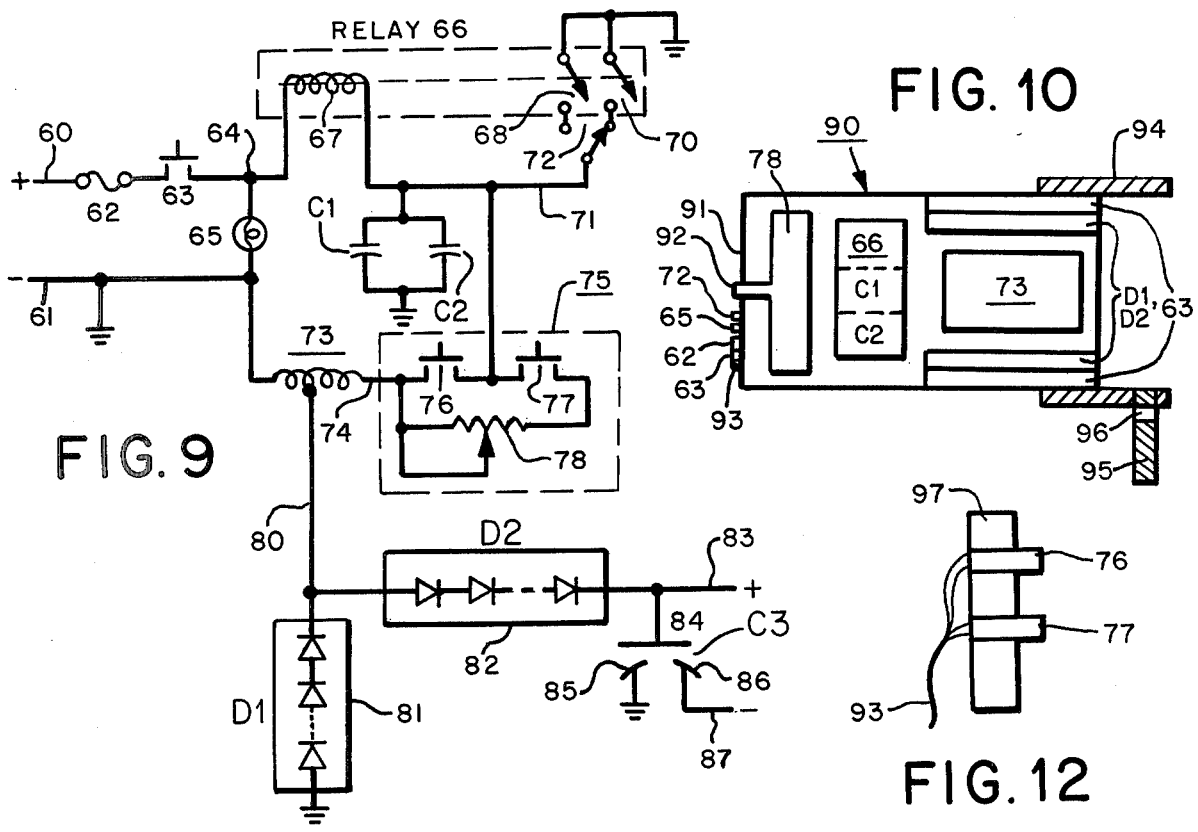
FIG. 9
FIG. 10
FIG. 12

LASER SYSTEM WITH TRIANGULATED CAPACITOR ENCIRCLING THE LASER HEAD

BACKGROUND OF THE INVENTION

Recently considerable work has been done to provide more efficient lasers, with a view toward portability and simplicity of construction. A recent significant advance in this field is described and claimed in Applicant's earlier application entitled "Laser System with Concentric Arrangement of Laser Head and High Voltage Capacitor", filed Nov. 16, 1977, Ser. No. 851,872. In that application a laser is described in which a pair of electrodes extend into the laser head, and the high voltage capacitor is comprised of metallic foil layers wound around the laser head. At that time it was believed that folding back of one metallic foil layer at a 45° angle to form a virtual isoceles triangle would assist in formation of a beam, and operation of that laser system proved this to be true. Even with this significant advance in the art, it was still desired to improve the beam formation further, and to improve the power supply arrangement for laser systems.

It is therefore a primary object of the present invention to provide a laser system in which the beam formation is substantially improved with respect to known systems, and also with respect to the system disclosed in Applicant's copending application.

Another important object of this invention is the provision of such a system in which the power supply construction is simplified and improved as contrasted to known arrangements.

SUMMARY OF THE INVENTION

A laser system constructed in accordance with the present invention includes a substantially cylindrical member. A pair of triangulated metallic foil members are provided, and each foil member has an edge portion extending slightly into and along the adjacent interior surface of the cylindrical member. A third triangulated metallic foil is attached to the outside of the cylindrical member, and a plurality of insulating sheets are then positioned between the foil members, with at least one insulating sheet between each pair of foil members. The cylindrical member is rotated to wind up the triangulated foils and the insulating sheets in a circular arrangement, providing a compact arrangement of the high voltage capacitor and laser head. The triangulation of the foil members forming the capacitor produces a very good beam formation when the system is operated. The power supply includes a variable resistor which can regulate the amount of current passed to the charging circuit, thus adjusting the level of power supplied to the laser head. A switch arrangement allows the variable resistor to regulate the power setting, or the variable resistor can be short circuited to fire the laser directly.

IN THE DRAWINGS

In the several figures of the drawings like reference numerals identify like components, and in those drawings:

FIG. 7 is a front view of the laser head with the metallic foil members and interleaved plastic insulator sheets, prior to winding the foil members and plastic sheets around the laser body;

FIG. 9 is a schematic diagram of the power supply used in conjunction with the laser head;

FIG. 10 is an illustrative showing of the packaging of the power supply components, taken from the side, and FIG. 11 is a front view of the arrangement; and FIG. 12 is a showing of a switch mounting suitable for use with the invention.

DETAILED DESCRIPTION OF THE INVENTION

Figure 1:
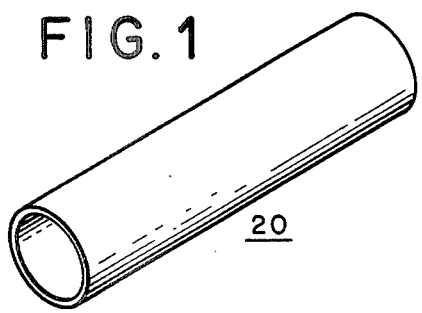
FIG. 1 is a perspective showing of a plastic cylinder used in constructing the invention.
Figure 2:
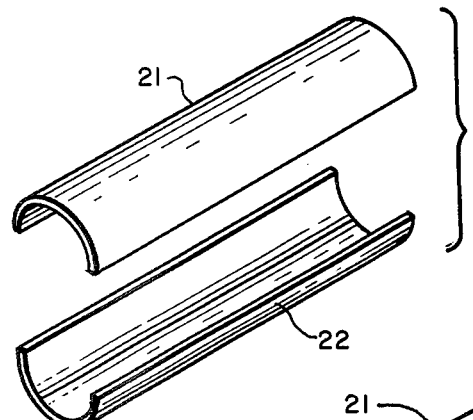
FIG. 2 is a perspective illustration showing the cylinder of FIG. 1 separated into two semi-cylinders.

The laser head and capacitor bank construction can best be understood by depicting and explaining their construction. To this end, FIG. 1 shows a cylinder 20 of polyvinyl chloride (pvc) tubing. In a preferred embodiment, cylinder 20 was a 30 inch length of ⅜ inch thickwall pvc tubing. The cylinder 20 was split into two segments 21 and 22, as illustrated in FIG. 2, to form two semi-cylinders. The two semi-cylinders 21,22 were then displaced from each other as shown generally in FIG. 3, and the first two of the three capacitor plates were attached to the semi-cylinders 21 and 22. Each of the two capacitor plates P1, P2 are of metallic foil, such as conventional aluminum foil frequently used for food wrapping. As better illustrated in FIG. 4, each of the plates P1 and P2 is generally triangular in shape. That is, the edge 23 is twice as long as the edge 24 which meets edge 23 at a right angle. It has been found that very good efficiency of beam formation is realized when the longer edge 23 is substantially twice the distance of the edge 24 joined to the semi-cylinder of the pvc tubing. In one embodiment, the edge 23 of both the metallic foil layers P1 and P2 was 56 inches in length, and the other edge 24 was 28 inches in length.

Figure 3:
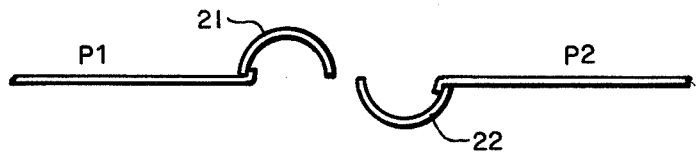
FIGS. 3 and 4 are front and top views, respectively, illustrating joinder of metallic foil plates to the semi-cylinders.
Figure 4:
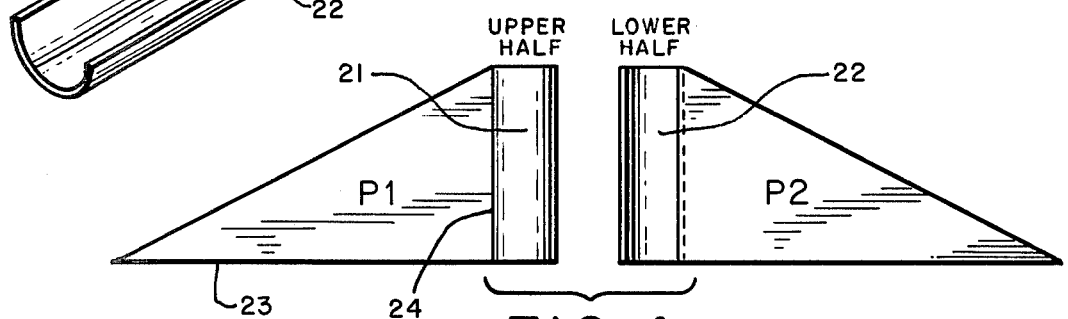
Figure 5:
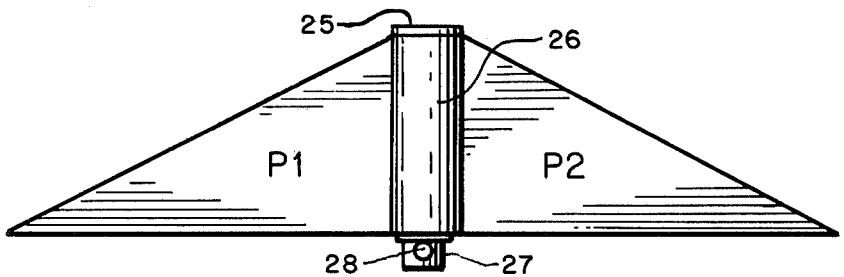
FIG. 5 is a top view, generally similar to FIG. 4, depicting the semi-cylinders rejoined to form the basic laser head component.

The shorter edge of each capacitor plate P1 and P2 was joined to the respective semi-cylinder by using contact cement to glue the last ¼ inch of the foil to the inner surface of the semi-cylinder, as shown in FIG. 3. The two semi-cylinders 21,22 are then united with contact cement to again form a cylinder, with the aluminum foil plates P1,P2 extending outwardly. A seal of silicone caulk is applied just above and just below each aluminum foil P1,P2 where they extend outwardly of the laser head 26. The result is the assembly shown generally in a top view in FIG. 5. A circular flat glass window 25 is then glued into one end of the laser head body 26. In the illustrated embodiment the glass window was ¾ inch in diameter to fit the pvc cylinder, and was ⅛ inch thick. Contact cement was used to glue the window in place.

At the other end of the laser head is a closure member 27, formed of pvc tubing which is ½ inch in diameter thickwall tubing, and one inch long. A ¼ inch bleed valve 28 was inserted into one end of the closure member or adapter 27, and five layers of plastic tape were wrapped around member 27 to provide a circumference closely approximating the inner diameter of laser head 26. The taped end of member 27 was then inserted into the end of laser head 26, and cemented with silicone caulk to effect a good seal.

Figure 6:
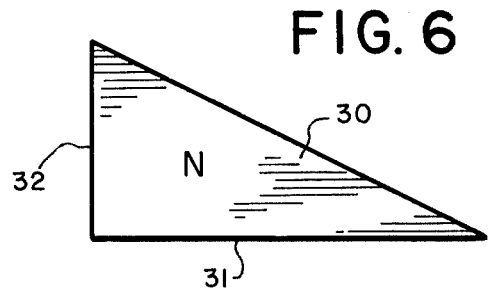
FIG. 6 is a top view of a third metallic foil member used in constructing the invention.

A third foil layer 30 is provided as shown in FIG. 6, and is designated the N member as it will become the negative plate in the capacitor construction. Again the edge 31 is substantially twice the length of edge 32, and the dimensions of the N foil sheet 30 are the same as the foil sheets P1 and P2. The N layer is then attached to an upper portion of the laser head 26, between the plates P1 and P2 as shown in FIG. 7, and the N member 30 is taped to the upper semi-cylinder 21 with plastic tape. Two layers of plastic 33,34 are then taped between the N plate and the P2 plate as shown; two additional plastic sheets 35,36 are taped as shown to semi-cylinder 21 between the P1 foil and the N layer; and the last two plastic sheets 37,38 are taped to the lower semi-cylinder 22, in a position between the foil layers P1 and P2. A 36 inch length of two-conductor speaker cable is provided, and one end is split so that the individual wires 41,42 are respectively connected to the forward edges (the edges nearer the valve end of the head) of the foil layers P1 and P2. This attachment can be by clear plastic tape to the aluminum foil. A connector 43, which in the embodiment constructed and successfully operated was a female blade connector, was attached to the other end of two wires. Connector 43 serves as the positive connection between the power supply and the high voltage capacitor comprised of P1,P2 and N. Then, looking at the assembly from the valve end as depicted in FIG. 7, the aluminum foil layers and interleaved plastic layers are wrapped around the head 26 in the clockwise direction. The insulating layers 33-38 can be conventional plastic materials, such as Mylar plastic, approximately 0.004 inch thick, of the type generally used for food wrapping.

Figure 8:
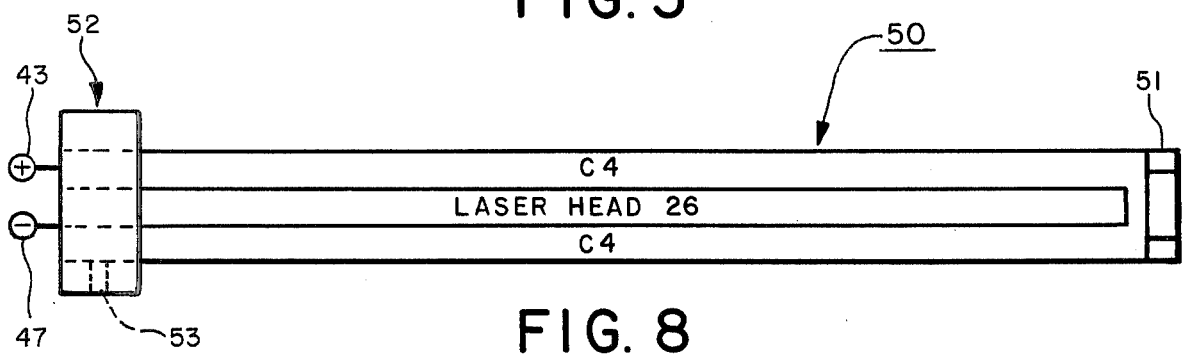
FIG. 8 is a side view of the laser head and high voltage capacitor assembly, with adapters at each end of the assembly.

Before the winding around the form 26 is completed two short strips of aluminum foil are inserted into the rear (valve end) of the head, but the better to illustrate the electrical connections, the short aluminum connectors 44,45 are depicted in FIG. 7. Each of these two strips was approximately four inches long, one inch wide, and 0.02 inch thick. One end of each short member was substantially rectangular and the other end was rounded. Before the winding is completed, the end of the N foil 30 is tucked around the rectangular end of strip 44, and similarly the end of the P1 plate is tucked around the rectangular end of the short foil connector 45. These short strips 44,45 were positioned to extend outwardly beyond the bleed valve 28, at a distance of approximately one inch from each other. A three inch length of insulated single conductor wire 46 was also provided, and had one inch stripped for connection to the same end of the N foil 30, as was the short foil connector 44. A male blade connector 47 was attached to the other end of conductor 46, and this represents the negative connection to the power supply. The entire laser head assembly 26, with the high power capacitor C4, including plates P1,P2 and N wound around the laser head, was positioned in another thickwall pvc cylinder 50, as shown in FIG. 8. The tube 50 was approximately 34 inches long, and at its forward end was closed with a reduction fitting 51. In the embodiment successfully built and tested there were three different fittings 51, with each having a lens of a different focal length; 500 millimeters, 1,000 millimeters, and 2,000 millimeters were the focal lengths of the lenses used. At the other end of the cylinder 50 was a reduction fitting 52, which was a four inch-to-two inch reduction fitting, also of pvc material. The reduction fitting was drilled at the bottom to define a one inch alignment hole 153. Connectors 43,47 extend from the assembly as shown. The spark gap elements 44,45 (FIG. 7) are not visible, as they do not extend beyond reduction fitting 52.

FIG. 9 illustrates the power supply for the laser system in this invention. A 12 volt d-c input voltage is supplied from a battery, or other suitable source (not shown), over input conductors 60,61. A fuse 62 and conventional push-button switch 63 are connected in series between conductor 60 and circuit point 64, and a lamp 65 is coupled between the circuit point 64 and input conductor 61, which is grounded. Thus lamp 65 is illuminated when input voltage is supplied and switch 63 is closed.

A relay 66 includes a winding 67 and a pair of contact sets 68,70. Relay winding 67 is coupled between circuit point 64 and conductor 71, and a single-pole, double-throw switch 72 has its movable contact connected to conductor 71. Hence the position of switch 72 determines which of the contact sets 68,70 is actually in the circuit at any time. When one of the contact sets wears out, switch 72 can be displayed to its alternate position and operation of the power supply continued.

A pair of capacitors C1,C2 are coupled as shown between conductor 71 and ground. Each of these capacitors was a conventional ignition type condenser of the competition type, such as those used in the distributor circuit with a racing type engine. Such capacitors are usually about 50 microfarads. This completes the low voltage portion of the power supply.

A spark coil 73, shown as an autotransformer, has a pair of input connections, one connected to input conductor 51 and the other connected to conductor 74. For reasons not presently understood, the circuit appears to function better with the negative connection of spark coil 73 connected to input conductor 61 and the positive connection connected to conductor 74, rather than vice versa. It will become apparent that a firing circuit 75 is comprised of a pair of momentary push-button switches 76,77, and a variable resistor 78. Thus when switch 76 is depressed push-button 76 connects conductors 71 and 74. When switch 74 is closed, the effective resistance of variable resistor 78—as determined by the setting of its movable arm—is inserted in the circuit between conductors 71 and 74. The other output connection from ignition coil 73 is over conductor 80 to a random ground, voltage doupler circuit. The high voltage circuit includes first and second diode assemblies D1 and D2. Each of the diode assemblies includes 75 individual diodes connected in series, and in a preferred embodiment the diodes were type 1N4007. The string of diodes in each assembly was inserted in a flexible plastic casing, represented by the rectangles 81 and 82. The cathode side of diode assembly D2 was connected to high voltage output conductor 83, and the anode side of diode assembly D1 was grounded.

The high voltage circuit is completed by another three-plate capacitor C3, constructed somewhat like the three-plate capacitor C4 described above. That is, capacitor C3 was wound around a stiff cardboard cylindrical form, approximately 3 and ¾ inches in diameter and 5 inches in length. On the outside of this form a piece of aluminum foil, about 2 inches by 12 inches, was glued, the 2 inch length being glued along the length (and centered) of the form. This foil is wound around the form, and then a plastic insulator sheet, approximately 24 inches in length, 5 inches in width, and 0.004 inch in thickness, is wrapped around the foil layer and then glued in place. A second foil strip, similar to the first, is then wrapped around the first plastic insulator and glued in place. Then a second insulator sheet is wound around the second foil layer and glued into place. A third layer of aluminum foil is wound around and glued to the second plastic layer, thus providing the three-plate configuration of C3 depicted in FIG. 9. Short lengths of insulated wire were utilized to provide the connections of plate 84 to high voltage output conductor 83, of plate 85 to ground, and of the last plate 86 to the high voltage output conductor 87. These conductors 83, 87 were connected to the connectors 43, 47 shown in FIGS. 7 and 8 to complete the high voltage power transfer circuit to the laser head. With the described construction, capacitor C3 had a total capacitance of 3,360 micromicrofarads, or 1,680 micromicrofarads for each side of the capacitor.

FIG. 10 shows the manner in which the major power supply components are held in place in another thick-wall pvc tube 90. In the embodiment built and tested the pvc tube 90 was eight inches long and four inches in diameter. The rear, or left side as shown in FIG. 10, of the unit was covered with a round Plexiglas member 91, four inches in diameter and ¼ inch thick. The Plexiglas 91 was held in place by three small screws 89 (FIG. 11) which pass through the Plexiglas and enter the pvc tube 90. The center of the Plexiglas was drilled to provide a hole accommodating the shaft 92 of the variable resistor 78, which was mounted as shown. The Plexiglas cover is also drilled out to accommodate the movable toggle of switch 72, a receptacle for fuse 62, and for a jack 93, a three-conductor phono jack used for providing the connections to push-button switches 76, 77 as shown in FIG. 12. The hole 99 was drilled to accommodate the power cable. Input switch 63 and indicator lamp 65 were also mounted in the Plexiglas as shown.

Behind resistor 78 in FIG. 10 is the relay 66, and capacitors C1 and C2, positioned as indicated. These components were taped together and secured in place with firm padding of sponge material and plastic sheeting. After wrapping the interior of three-plate capacitor C3 with several layers of plastic sheeting, the capacitor C3 was positioned as shown within the tube 90. The diode assemblies D1 and D2 are positioned in a circular manner around the interior of capacitor C3. Ignition coil or spark condenser 73 is then positioned in the center of the diode assemblies and supported in place with strips of cardboard. Except for the Plexiglas panel 91, the remainder of the assembly shown in FIG. 10 is then sprayed with a high voltage insulating material. The right side or forward end of the pvc tube 90 has a female-to-female adaptor 94, to accommodate the different reduction settings of the separate laser heads. Adaptor 94 includes a depending leg portion 95, drilled to define a one inch alignment hole 96. This assists aligning the power supply assembly with a specific laser head assembly of the type shown in FIG. 8. The firing switches 76, 77 are mounted in a one inch diameter acrylic rod 97 six inches in length, as shown in FIG. 11. The rod 97 fits through the alignment holes 53 and 96 to provide the requisite component alignment. The switches 76, 77 are wired to the three-conductor power cable 98, 36 inches long, which was connected to the three-conductor phono jack 93. One wire of each switch 76, 77 was connected to a common ground connection.

In operation, when switch 63 is closed, an input circuit is completed to energize lamp 65, and relay winding 67 is pulsed through the parallel-capacitors C1, C2. This closes the contact sets 61, 70, and with switch 72 in the position indicated, an obvious holding circuit for the relay is completed over contact set 70 to ground. If switch 77 is closed, the spark coil 73 has its circuit completed through the effective portion of variable resistor 78. This provides a high voltage, of the order 40,000 volts, on line 80 to the voltage doubler circuit. Conventional operation of the voltage doubler circuit produces a voltage of order of 80,000 volts on output conductors 83, 87 which is transferred to the high voltage capacitors C4 to provide beam formation in the laser head. Each switch 76 is depressed instead of switch 77, the resistance is removed from the circuit of the spark coil and the larger current flow effects a larger power transfer into the laser head.

Technical Advantages

At the present time it appears that formation of a wider beam is enhanced by the use of diffusion electrodes in the present invention. The diffusion electrodes are provided by the extension of the edge portions of the metallic foil members P1 and P2 into the cylindrical laser head assembly, with the edge portions being turned at substantially right angles and extending along the adjacent short length (approximately ¼") of the inner wall of the semi-cylinder (see FIG. 3). It is this short extension along the interior of the semi-cylinder wall which provides the diffusion electrodes, as contrasted to a knife edge, or substantially thinner, electrodes. The diffusion electrodes produce a wider beam, approximately ¼"—corresponding to the dimension of the diffusion electrode—than would otherwise be produced. This also allows formation of the arc along the lines of least resistance, with a random orientation of the plasma, and causes a larger beam cross-section to be available. This construction allows the plane of plasma emission to be affected by rotational magnetic fields induced by the ignition pulse traveling through the firing circuit and capacitor bank. This produces a larger cross-section of plasma activity (equal to the diffusion electrode width) than could be achieved with fixed plane orientation. Of course there are numerous benefits, both in simplicity of construction and from the resultant circuit parameters which flow from the diffusion electrodes being formed directly from the metallic foils comprising the capacitor bank. For example the inductance and capacitance of the high voltage circuit are minimized, and the reduced impedance means there is a much more efficient power transfer in the laser head.

Another important advantage is realized by utilizing the separable power pack and trigger arrangement, as described in connection with FIGS. 10–12. Different laser heads of the type shown in FIG. 8 can readily be mated with the power pack. The output voltage delivered by the power pack can be preset, or even adjusted while the system is in operation, by adjusting the variable resistor 78. Push buttons 76, 77 provide a specific trigger arrangement for precise fire control.

The triangulated form of all three foil plates in the high power capacitor C4 effects a substantial size advantage over earlier known designs, including that of the earlier-filed application identified above. This has been achieved with precise fire control and only a slight decrease in the level of the charge stored for firing the laser. A substantially higher resonant ignition voltage has been noted, as well as increased development and definition of the traveling wave form. This higher resonant ignition pulse, especially in connection with the much lower impedance of the firing circuit, contributes to the much greater efficiency of the laser operation of this invention. It appears the actual operating efficiency of the capacitor banks was increased about 300 percent with respect to that of the design shown in the application noted above.

In the embodiment actually built and tested, fuse 62 was a 7 amp, 32 volt panel fuse. Switch 63 was a single pole, single throw, normally open push-button switch rated at 10 amps, 120 volts. Relay 66 was a double pole, double throw relay having contacts rated for 10 amps, 120 volts. The relay winding was rated for 12 volts d-c, with 126 milliamps through a 95 ohm coil. The relay had an 8 pin octal base, like the vibrating reed relays formerly used in automotive radio power supplies and still available in automotive stores. Switch 72 was a single pole, double throw, miniature toggle switch rated at 10 amps, 120 volts. Both capacitor C1 and C2 were competition type capacitors, which are usually about 50 microfarads.

The ignition coil 73 was a competition type ignition coil, as noted above. The momentary push-button switches 76,77 were single pole, single throw, normally open type, rated at 3 amps, 250 volts. The other components have been carefully described and/or identified in the specification above.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A laser head comprising a cylindrical member and a capacitor assembly concentric with said cylindrical member, characterized in that the capacitor assembly comprises at least three metallic foil members, with the edge portions of two of the metallic members extending through the cylindrical member to form electrodes, a plurality of insulating sheets interspersed between the metallic foil members to provide insulation in the capacitor assembly, and further characterized in that each of said metallic foil members is substantially triangular, to assist in beam formation in the laser.

2. A laser head as claimed in claim 1, and further characterized in that the edge portions of the metallic foil members which extend into the cylindrical member are each turned at right angles and follow the curvature of the cylindrical member for a short distance, thus providing diffusion electrodes in the interior of the laser head, providing a wider beam than would otherwise be produced.

3. A laser head comprising a cylindrical member and a capacitor assembly concentric with said cylindrical member, characterized in that the capacitor assembly comprises at least three metallic foil members, each of said metallic foil members being substantially triangular, with the edge portions of two of the metallic members extending through the cylindrical member to form electrodes, and a plurality of insulating sheets interspersed between the metallic foil members to provide insulation in the capacitor assembly.

4. A laser head as claimed in claim 3, and further characterized in that the edge portions of the metallic foil members which extend into the cylindrical member are each turned at right angles and follow the curvature of the cylindrical member for a short distance, thus defining diffusion electrodes in the interior of the laser head, providing a wider beam than would otherwise be produced.

5. A laser head comprising a pair of semi-cylinders, characterized by a first triangular metallic foil member having an edge portion affixed to one of the semi-cylinders along an edge and the adjacent interior portion thereof, a second triangular metallic foil member having an edge portion affixed to the other of said semi-cylinders along an edge and the adjacent interior portion thereof, means for joining said first and second semi-cylinders to form a substantially cylindrical unit with the metallic foil members extending outwardly, a third triangular metallic foil member having an edge portion affixed to the substantially cylindrical member, and a plurality of insulating sheets interspersed between the metallic foil members in the appropriate positions to provide electrical insulation between the foil members when the cylindrical member is rotated to wind the metallic foil members and the insulating sheets in an annular configuration about the cylindrical member to provide a capacitor assembly concentric with the cylindrical unit.

* * * * *